(12) United States Patent
Rockstroh et al.

(10) Patent No.: US 11,027,368 B2
(45) Date of Patent: Jun. 8, 2021

(54) CONTINUOUS ADDITIVE MANUFACTURE OF HIGH PRESSURE TURBINE

(71) Applicant: GENERAL ELECTRIC COMPANY, Schenectady, NY (US)

(72) Inventors: Todd Jay Rockstroh, Cincinnati, OH (US); William Thomas Carter, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 206 days.

(21) Appl. No.: 15/667,304

(22) Filed: Aug. 2, 2017

(65) Prior Publication Data

US 2019/0039182 A1 Feb. 7, 2019

(51) Int. Cl.
| | |
|---|---|
| *B23K 26/342* | (2014.01) |
| *B33Y 10/00* | (2015.01) |
| *B33Y 30/00* | (2015.01) |
| *B33Y 70/00* | (2020.01) |
| *B33Y 80/00* | (2015.01) |
| *B23K 26/03* | (2006.01) |
| *B22F 5/04* | (2006.01) |
| *B22F 5/00* | (2006.01) |
| *B22F 10/00* | (2021.01) |
| *B23K 101/00* | (2006.01) |

(Continued)

(52) U.S. Cl.
CPC ............ *B23K 26/342* (2015.10); *B22F 5/009* (2013.01); *B22F 5/04* (2013.01); *B22F 10/00* (2021.01); *B23K 26/032* (2013.01); *B33Y 10/00* (2014.12); *B33Y 30/00* (2014.12); *B33Y 70/00* (2014.12); *B33Y 80/00* (2014.12); *B22F 10/10* (2021.01); *B23K 2101/001* (2018.08); *B23K 2103/05* (2018.08); *B23K 2103/10* (2018.08); *B23K 2103/14* (2018.08); *C22C 1/0416* (2013.01); *C22C 1/0433* (2013.01); *C22C 1/0458* (2013.01); *C22C 33/02* (2013.01)

(58) Field of Classification Search
CPC ............................. B33Y 10/00; B23K 26/342
USPC ........................................................ 419/66
See application file for complete search history.

(56) References Cited

U.S. PATENT DOCUMENTS

| | | |
|---|---|---|
| 4,863,538 A | 9/1989 | Deckard |
| 5,460,758 A | 10/1995 | Langer et al. |

(Continued)

FOREIGN PATENT DOCUMENTS

WO    2017/080659 A1    5/2017

OTHER PUBLICATIONS

Liravi, F., et al., "Separation force analysis and prediction based on cohesive element model for constrained-surface Stereolithography processes," Computer Aided Design, Elsevier Publishers BV., Barking GB, vol. 69, pp. 134-142 (May 15, 2015).

(Continued)

*Primary Examiner* — Weiping Zhu
(74) *Attorney, Agent, or Firm* — Dinsmore & Shohl LLP

(57) ABSTRACT

A method of manufacturing an object by additive manufacturing is provided. The method includes lowering a build platform having a given layer of build material to powder provided on a window. The powder is irradiated to form a subsequent layer that corresponds to the given layer. The method then includes solidifying the subsequent layer, and raising the build platform and the subsequent layer away from the window. The steps are repeated until the desired object is formed.

5 Claims, 4 Drawing Sheets

(51) Int. Cl.
  *B23K 103/04*  (2006.01)
  *B23K 103/10*  (2006.01)
  *B23K 103/14*  (2006.01)
  *C22C 1/04*  (2006.01)
  *C22C 33/02*  (2006.01)
  *B22F 10/10*  (2021.01)

(56) References Cited

U.S. PATENT DOCUMENTS

| | | |
|---|---|---|
| 8,506,836 B2 | 8/2013 | Szuromi et al. |
| 8,691,333 B2 | 4/2014 | Godfrey et al. |
| 9,027,244 B2 | 5/2015 | Nebesni |
| 9,266,170 B2 | 2/2016 | Godfrey et al. |
| 2010/0200189 A1 | 8/2010 | Qi et al. |
| 2013/0015609 A1* | 1/2013 | Landau ............... B33Y 10/00 264/497 |
| 2014/0186549 A1 | 7/2014 | Miyagi et al. |
| 2016/0346835 A1 | 12/2016 | Ownby et al. |
| 2019/0126533 A1* | 5/2019 | Thompson ............ B29C 64/124 |
| 2019/0126535 A1* | 5/2019 | Thompson ............ B29C 64/135 |
| 2019/0126536 A1* | 5/2019 | Thompson ............ B29C 64/255 |
| 2019/0126548 A1* | 5/2019 | Barnhart ............... B29C 64/268 |

OTHER PUBLICATIONS

Extended European Search Report issued in connection with corresponding EP Application No. 18184876.3 dated Nov. 12, 2018.
English Translation of Chinese Office Action for application 201810871246.4 dated May 11, 2020 (14 pages).

* cited by examiner

CONTINUOUS ADDITIVE MANUFACTURE OF HIGH PRESSURE TURBINE

The present disclosure generally relates to additive manufacturing apparatuses and methods for additively manufacturing metal parts. More specifically, the present disclosure relates to an apparatus and method for repeatedly lowering an object to be additively manufactured into a metal powder over a translucent surface, and melting or consolidating the metal into layers of the object using light projection and/or a focused energy beam through the translucent surface.

BACKGROUND

Additive manufacturing processes generally involve the buildup of one or more materials to make a net or near net shape (NNS) object, in contrast to subtractive manufacturing methods. Though "additive manufacturing" is an industry standard term (ASTM F2792), additive manufacturing encompasses various manufacturing and prototyping techniques known under a variety of names, including freeform fabrication, 3D printing, rapid prototyping/tooling, etc. Additive manufacturing techniques are capable of fabricating complex components from a wide variety of materials. Generally, a freestanding object can be fabricated from a computer aided design (CAD) model. A particular type of additive manufacturing process uses an energy beam, for example, an electron beam or electromagnetic radiation such as a laser beam, to sinter or melt a powder material, creating a solid three-dimensional object in which particles of the powder material are bonded together. Different material systems, for example, engineering plastics, thermoplastic elastomers, metals, and ceramics are in use. Laser sintering or melting is a notable additive manufacturing process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of additive manufacturing processes.

Selective laser sintering, direct laser sintering, selective laser melting, and direct laser melting are common industry terms used to refer to producing three-dimensional (3D) objects by using a laser beam to sinter or melt a fine powder. For example, U.S. Pat. Nos. 4,863,538 and 5,460,758 describe conventional laser sintering techniques. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

FIG. 1 is a diagram showing a cross-sectional view of an exemplary conventional system 100 for direct metal laser sintering ("DMLS") or direct metal laser melting (DMLM). The apparatus 100 builds objects, for example, the part 122, in a layer-by-layer manner by sintering or melting a powder material (not shown) using an energy beam 136 generated by a source 120, which can be, for example, a laser for producing a laser beam, or a filament that emits electrons when a current flows through it. The powder to be melted by the energy beam is supplied by reservoir 126 and spread evenly over a powder bed 112 using a recoater arm 116 travelling in direction 134 to maintain the powder at a level 118 and remove excess powder material extending above the powder level 118 to waste container 128. The energy beam 136 sinters or melts a cross sectional layer of the object being built under control of an irradiation emission directing device, such as a galvo scanner 132. The galvo scanner 132 may include, for example, a plurality of movable mirrors or scanning lenses. The speed at which the laser is scanned is a critical controllable process parameter, impacting how long the laser power is applied to a particular spot. Typical laser scan speeds are on the order of 10 to 100 millimeters per second. The build platform 114 is lowered and another layer of powder is spread over the powder bed and object being built, followed by successive melting/sintering of the powder by the laser 120. The powder layer is typically, for example, 10 to 100 microns. The process is repeated until the part 122 is completely built up from the melted/sintered powder material.

The laser 120 may be controlled by a computer system including a processor and a memory. The computer system may determine a scan pattern for each layer and control laser 120 to irradiate the powder material according to the scan pattern. After fabrication of the part 122 is complete, various post-processing procedures may be applied to the part 122. Post processing procedures include removal of excess powder by, for example, blowing or vacuuming. Other post processing procedures include a stress release process. Additionally, thermal and chemical post processing procedures can be used to finish the part 122.

Additive manufacturing, by way of irradiation of a material through a translucent window upon which the build material rests, is typically referred to as processes such as, for example, constrained stereolithography when the radiation source is a laser or digital light processing (DLP) when the radiation source is a digital light projector. These processes have an advantage over conventional powder bed processes in that the irradiated material is formed against a window often eliminating the need for certain support structures. Constrained stereolithography and DLP are often limited, however, and do not work well with metal powders, coated metal powders, and metal slurries.

SUMMARY OF THE INVENTION

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

The foregoing and/or aspects of the present invention may be achieved by a method of manufacturing an object by additive manufacturing. In an aspect, the method includes (a) lowering a build platform having a given layer of build material to powder provided on a window; (b) irradiating the powder to form a subsequent layer corresponding to the given layer; (c) solidifying the subsequent layer; (d) raising the build platform and the solidified subsequent layer away from the window; and (e) repeating steps (a)-(d) until the object is formed.

The foregoing and/or aspects of the present invention may be achieved by an apparatus for additive manufacturing an object. In an aspect, the apparatus includes a powder dispenser, a window, and a platform on which the object is built. The apparatus also includes a recoater providing layers of powder over the window and an irradiation source positioned below the window.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

The present invention relates to additive manufacturing and utilizes, but is not limited to, additive technology of metal powders in a layer by layer manner. In one aspect, powdered metal may be melted to form each part layer. It may be appreciated by those skilled in the art that the present invention is not limited to melted powders but may also be applicable to polymer coated metal powders and metal powder containing slurries.

The present invention provides an apparatus capable of continuously extracting a part from loose powder or powder slurry irradiating a 2D cross section from below the powder/slurry and continuously fusing the 2D sections until the part is completed and separate from the powder source.

Figure 2:
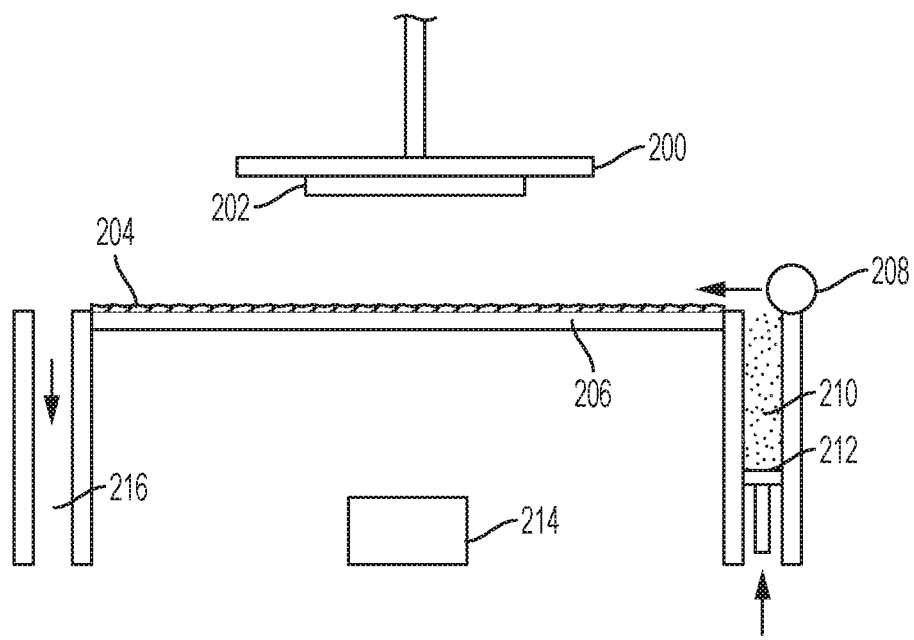
FIG. 2 illustrates an apparatus for additive manufacturing, according to an embodiment of the present invention.
Figure 3:
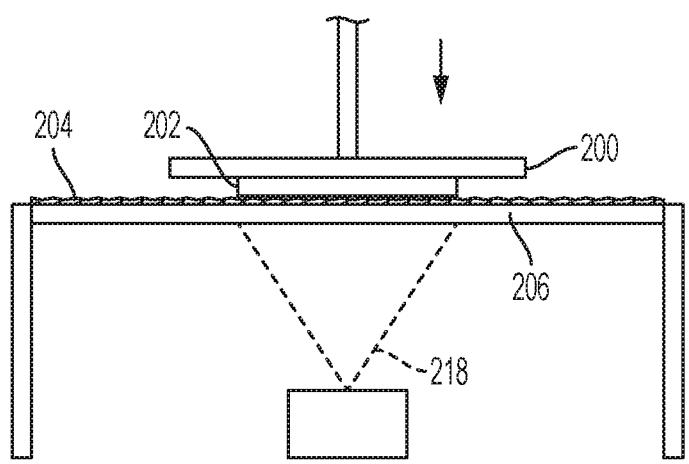
FIG. 3 illustrates an apparatus for additive manufacturing, according to an embodiment of the present invention.

FIGS. 2-5 illustrate an apparatus for additive manufacturing according to exemplary embodiments of the present invention. In FIG. 2, the apparatus includes a build plate 200 horizontally oriented and configured to be vertically lowered and raised to build an object 202. The build plate 200 may be made of a heat resistant material that may adhere to the object 202 being built. For example, the build plate 200 may be lowered to position the object 202 being built into a metal powder 204.

The apparatus also includes a powder recoater mechanism 208 to provide a layer of the metallic powder 204 over a translucent window 206. The powder 204 may be supplied from reservoir 210 by powder feeder 212. The layer of powder 204 may be thin or thick depending on a subsequent layer of powder for the part being built. Generally, the layer thickness may be kept constant throughout the build process. The recoater mechanism 208 moves horizontally and sweeps a uniform layer of powder 204 over the window 206 each time the object 202 is lifted from the powder 204. The recoater mechanism 208 may include a recoater blade (not shown) to provide control of the powder 204 over the window 206, and may also be configured, for example, as a hopper where powder may be dropped onto the window 206.

The window 206 may define a length and width of an area for building the object 202. A size of the window 206 may vary dependent upon the size of the part being built. The window 206 may be made of a material that may withstand energy emitted thereon from an energy source. It may also be made of a material in which the melted metal powder 204 may not adhere. Exemplary materials for the window 206 may include translucent materials capable of withstanding high heat such as, for example, quartz and glass. The melting point of the metal powder 204 may be lower than that of the translucent window 206. In the case of high melting point metals, however, an embodiment of the present invention may work by coating the metal powder 204 with a radiation curable polymer that fuses when exposed to laser or other light sources. The object 202 may then be further heat treated to drive off the polymer and/or fuse the metallic powder 204 into a solid object.

The apparatus may include an energy source 214 positioned below the translucent window 206, as shown in FIGS. 2-5. The energy source 214 may be, for example, a laser or laser galvo or a digital light projector capable of projecting light through the translucent window 206 and either melting or fusing the metal powder 204 placed above the window 206. Where the energy source 214 is a digital light projector, for example, the energy source 214 may be capable of projecting 2D patterns of light through the window 206.

Figure 4:
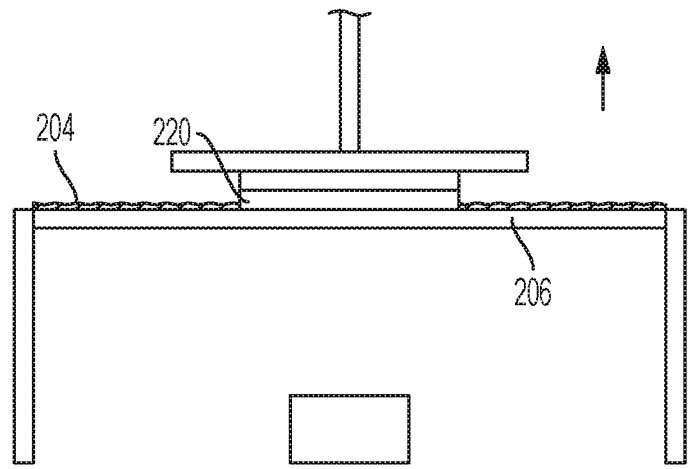
FIG. 4 illustrates an apparatus for additive manufacturing, according to an embodiment of the present invention.
Figure 5:
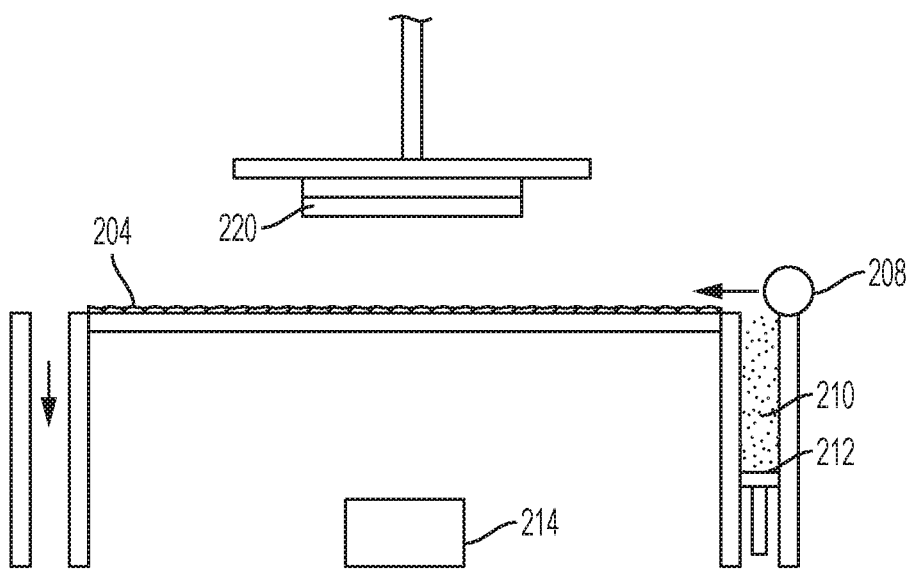
FIG. 5 illustrates an apparatus for additive manufacturing, according to an embodiment of the present invention.

As shown in FIG. 2, the build plate 200 may be lowered such that a last layer of the object 202 being built contacts the metal powder 204. A laser beam or light pattern 218 emitted from the energy source 214 melts or fuses a select 2D area of the metal powder 204 (see FIG. 3). Upon re-solidification, the fused layer forms the next layer 220 of the object 202, as shown in FIG. 4. In FIG. 5, the build plate 200 may be raised and a new layer of powder 204 may then be provided over the translucent window 206 to continue building the object 202. The process may be repeated until the desired metal part is formed. As mentioned above, the new layer of powder may be thinner or thicker depending on the part being built, although the layer thickness is generally consistent throughout the process. Unused powder may be collected in a receptacle 216 to be recycled and reused, as shown in FIG. 2.

Metallic powder materials for building the object 202 may be, for example, stainless steel alloys, aluminum alloys, titanium alloys, nickel based superalloys, and cobalt based superalloys. Where the metal powder 204 is utilized, the energy source 214 must be capable of melting the powder 204 without damaging the translucent window 206. Low melting point powders or fusable alloys may be more suitable for use and include, for example, known eutectic and non-eutectic alloys having a melting point below 250° C.

Figure 6:
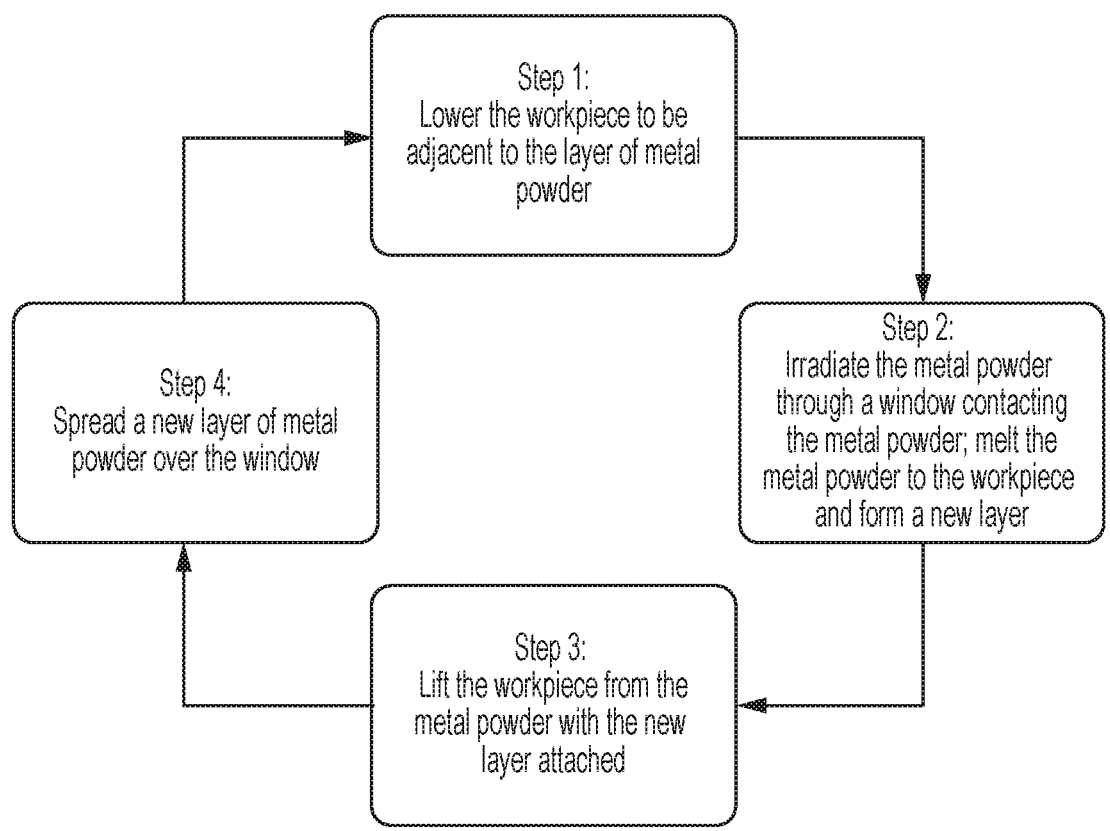
FIG. 6 is a diagram of an additive manufacturing process, according to an embodiment of the present invention.

FIG. 6 is a diagram of an additive manufacturing process, according to an embodiment of the present invention. A first step, for example, may involve fastening the workpiece/object 202 to the build plate 200 and lowering the workpiece 202 to the layer of metal powder 204. In step 2, the metal powder 204 may be irradiated through the window 206 contacting the metal powder 204. The metal powder 204 may then be melted to the workpiece 202 to form the new layer 220. In step 3, the workpiece 202 with the new layer 220 may then be lifted from the metal powder 204. In step 4, a new layer of the metal powder 204 may be spread across the window 206. The process may be repeated until the desired part is fully built.

Figure 1:
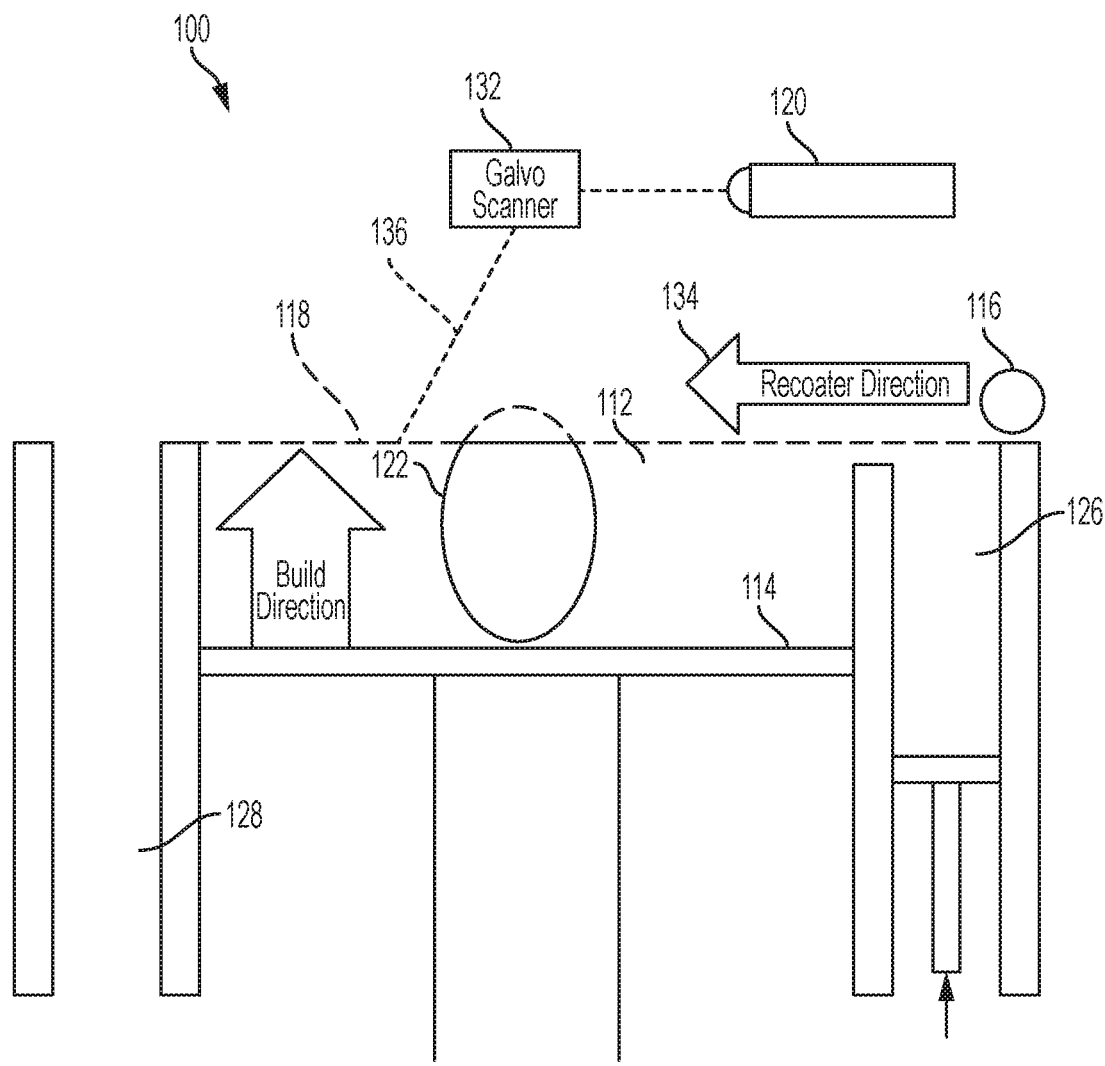
FIG. 1 is a diagram of a conventional apparatus for additive manufacturing.

The above-described manufacturing methods, in accordance with the present exemplary embodiments, may be used to repair the tip portion of a high pressure turbine blade. Methods for repairing an turbine blade tip using metal powder additive techniques are disclosed in Garay et al., "Method of Repairing a Turbine Component using Ultra-Thin Plate," U.S. patent application Ser. No. 15/439,643 filed Feb. 22, 2017. These methods, however, require placing the turbine blade into a traditional powder bed manufacturing apparatus similar to that of FIG. 1. A disadvantage of such an approach is that a powder bed must be created around at least the portion to be repaired or built.

The methods in accordance with exemplary embodiments of the present invention are particularly advantageous for tip repair because the turbine blade may be attached to the build platform and lowered toward the window such that only the tip portion to be repaired need come into contact with the metal powder. As such, unnecessary powder use may be eliminated. Using the present techniques, for example, the damaged turbine blade tip may be ground to a flat surface, attached to the build plate such that the flat surface faces toward the window, and the partial turbine blade lowered into the metal powder above the window where the build may take place. Additionally, the above-described process, in accordance with the present exemplary embodiments, may be used to create entirely new turbine blades or stator vanes, or other desired metal objects.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A method of repairing a turbine blade or a stator vane with a damaged tip by additive manufacturing, comprising:
    (a) attaching the turbine blade or the stator vane with the damaged tip ground to a flat surface to a build platform such that the flat surface faces down;
    (b) lowering the build platform having the turbine blade or the stator vane with the damaged tip to position the damaged tip into a layer of powder provided on a window;
    (c) irradiating the powder to form a layer onto the damaged tip;
    (d) solidifying the layer;
    (e) raising the build platform and the solidified layer away from the window; and
    (f) repeating steps (b)-(e) until the damaged tip is repaired.

2. The method of claim 1, wherein the irradiation is digital light processing, laser, or e-beam irradiation.

3. The method of claim 1, wherein the powder has a lower melting point than the window.

4. The method of claim 1, wherein the powder is irradiated through the window but adheres to the flat surface positioned above the window.

5. The method of claim 1, wherein the powder is cobalt chrome alloy, stainless steel alloy, aluminum alloy, titanium alloy or nickel based superalloy.

* * * * *